United States Patent
Lauer

(10) Patent No.: US 10,914,269 B2
(45) Date of Patent: Feb. 9, 2021

(54) DEVICE FOR INJECTING WATER IN A VEHICLE, AND METHOD FOR OPERATING SUCH A DEVICE

(71) Applicant: Bayerische Motoren Werke Aktiengesellschaft, Munich (DE)

(72) Inventor: Manfred Lauer, Ainhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 125 days.

(21) Appl. No.: 16/277,018

(22) Filed: Feb. 15, 2019

(65) Prior Publication Data

US 2019/0178208 A1 Jun. 13, 2019

Related U.S. Application Data

(63) Continuation of application No. PCT/EP2017/068565, filed on Jul. 24, 2017.

(30) Foreign Application Priority Data

Aug. 29, 2016 (DE) .......................... 10 2016 216 235

(51) Int. Cl.
*F02M 25/00* (2006.01)
*F02M 25/022* (2006.01)
(Continued)

(52) U.S. Cl.
CPC ......... *F02M 25/0221* (2013.01); *F02B 47/02* (2013.01); *F02D 41/0025* (2013.01);
(Continued)

(58) Field of Classification Search
CPC ............. F02M 25/0221; F02M 25/025; F02M 25/0227; F02D 41/0025; F02B 47/02; Y02T 10/121
See application file for complete search history.

(56) References Cited

U.S. PATENT DOCUMENTS 6,505,579 B1 * 1/2003 Lee .................. F02B 47/02
123/25 A
2006/0266307 A1 * 11/2006 Mezheritsky ...... F02M 25/0227
123/25 C
(Continued)

FOREIGN PATENT DOCUMENTS

CN 86 2 04160 U 12/1986
DE 10 2009 029 408 A1 3/2011
(Continued)

OTHER PUBLICATIONS

International Search Report (PCT/ISA/210) issued in PCT Application No. PCT/EP2017/068565 dated Sep. 22, 2017 with English translation (five pages).

(Continued)

*Primary Examiner* — Hung Q Nguyen
(74) *Attorney, Agent, or Firm* — Crowell & Moring LLP

(57) ABSTRACT

A device for injecting water in a vehicle includes a water container which is connected to a number of injection nozzles via a supply line, with a pumping operation for pumping water from the water container to the injection nozzles via the supply line and with a stationary operation in which the supply line is a closed line system. The supply line is equipped with a blocking device which is open in the pumping operation and which is closed in the stationary operation in order to block the supply line and keep same dry. Water is prevented from being suctioned into the supply line and the injection nozzles at low temperatures as a result of a pressure decrease.

12 Claims, 1 Drawing Sheet

(51) Int. Cl.
  *F02M 25/025* (2006.01)
  *F02B 47/02* (2006.01)
  *F02D 41/00* (2006.01)

(52) U.S. Cl.
  CPC ...... *F02M 25/025* (2013.01); *F02M 25/0227* (2013.01); *Y02T 10/12* (2013.01)

(56) References Cited

U.S. PATENT DOCUMENTS

2011/0088800 A1* 4/2011 Core .................. F01N 3/04
                                                                 137/613
2018/0119649 A1* 5/2018 Obergfaell .......... F02M 25/025

FOREIGN PATENT DOCUMENTS

| DE | 102009029408 | * | 3/2011 |
| DE | 10 2011 088 221 A1 | | 6/2013 |
| DE | 10 2012 206 979 A1 | | 10/2013 |
| DE | 10 2012 207 907 A1 | | 11/2013 |
| DE | 102013204474 A1 | * | 9/2014 |
| DE | 10 2014 202 038 A1 | | 8/2015 |
| DE | 10 2014 204 509 A1 | | 9/2015 |
| DE | 10 2014 222 463 A1 | | 5/2016 |
| DE | 102015208508 A1 | * | 11/2016 |
| WO | WO 2006/064028 A1 | | 6/2006 |

OTHER PUBLICATIONS

German-language Written Opinion (PCT/ISA/237) issued in PCT Application No. PCT/EP2017/068565 dated Sep. 22, 2017 (six pages).

German-language Search Report issued in counterpart German Application No. 10 2016 216 235.7 dated May 22, 2017 with partial English translation (13 pages).

German-language Office Action issued in counterpart German Application No. 10 2016 216 235.7 dated May 22, 2017 (six pages).

Cover page of EP 1 836 379 A1 published Sep. 26, 2007 (one page).

Chinese-language Office Action Issued in Chinese Application No. 201780035417.3 dated Oct. 16, 2020 with English translation (11 pages).

* cited by examiner

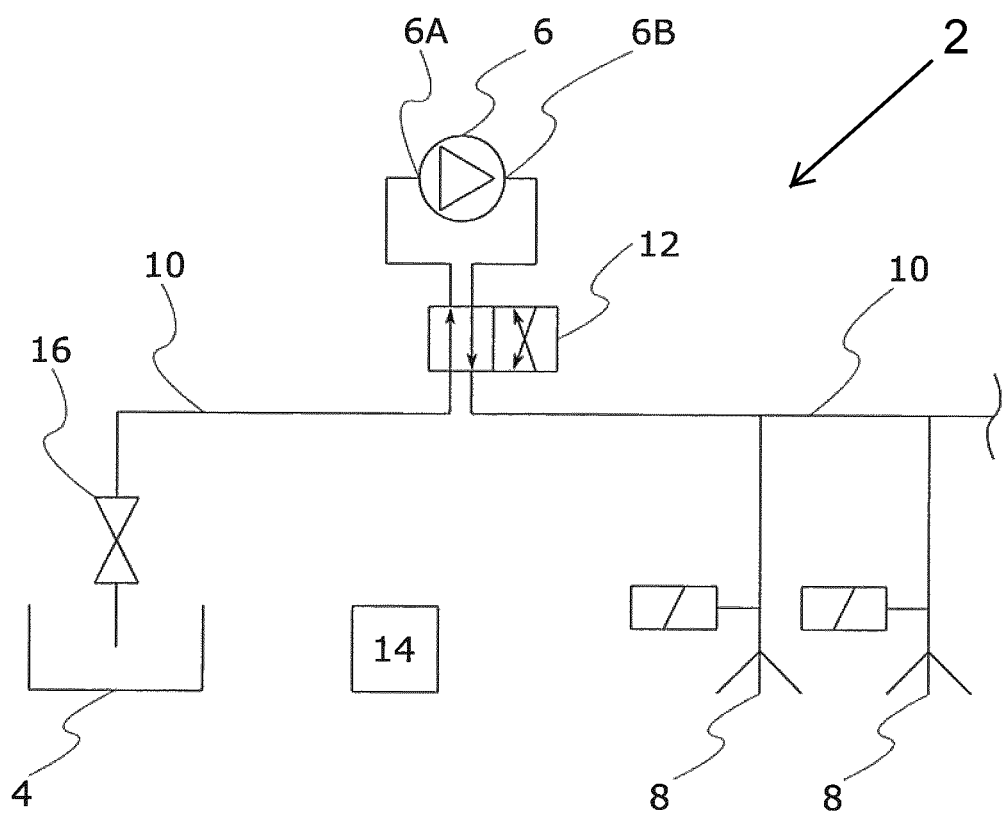

DEVICE FOR INJECTING WATER IN A VEHICLE, AND METHOD FOR OPERATING SUCH A DEVICE

CROSS REFERENCE TO RELATED APPLICATIONS

This application is a continuation of PCT International Application No. PCT/EP2017/068565, filed Jul. 24, 2017, which claims priority under 35 U.S.C. § 119 from German Patent Application No. 10 2016 216 235.7, filed Aug. 29, 2016, the entire disclosures of which are herein expressly incorporated by reference.

BACKGROUND AND SUMMARY OF THE INVENTION

The invention relates to a device for injecting water in a vehicle and a method for operating such a device.

A device for water injection is described for example in DE 10 2014 222 463 A1.

In order to improve the operation of an internal combustion engine of a vehicle, it is known to mix in water with the fuel. For this, a water injection device is usually employed, also known as a water injection system. Such a device usually comprises a pump, which supplies water from a water container via suitable lines, i.e., via a supply line, to a number of injection nozzles. By means of the injection nozzles, also called injectors, water is then sprayed in during operation, for example into the intake system in the vehicle. After the driving operation is over, water may remain in the injection nozzles and the supply line. In order to prevent damaging the device by the freezing of this water, the device is usually drained at the end of the drive, for example as described in the aforementioned DE 10 2014 222 463 A1.

Against this background, the problem which the invention proposes to solve is to provide an improved device for water injection, which is protected in a better manner against damage due to freezing water.

The problem is solved by a device for injecting water as well as by a method of operating same in accordance with embodiments of the invention. Advantageous embodiments, modifications and variants are described and claimed herein. The modifications and advantages mentioned in connection with the device also hold analogously for the method and vice versa.

The device serves for injecting water in a vehicle, which has in particular an internal combustion engine, or engine for short. The device comprises a water container which is connected to a number of injection nozzles via a supply line. The device can be operated in a delivery operation for pumping water from the water container to the injection nozzles via the supply line, i.e., for the injecting of water for example into an intake system of the vehicle. Furthermore, the device can also be operated preferably in a drainage operation, for the draining of the injection nozzles and the supply line, i.e., for the removal of water from the injection nozzles and the supply line. The drainage operation and the delivery operation in particular are mutually exclusive, i.e., at a given time only one of the two operations can be carried out. The delivery operation in particular is used solely in a driving operation, i.e., when the internal combustion engine is turned on and the vehicle is active.

The supply line in a stationary operation is in particular a line system closed off from the surroundings, so that no pressure equalization with the surroundings is possible. In other words, the device is closed off, in particular pressure-tight, when the vehicle is parked, i.e., in stationary operation. The supply line is closed off on the one hand by a blocking device, and on the other hand by the injection nozzles, through which water is injected into the engine during operation, but in the stationary operation they are advisedly closed. Accordingly, in the stationary operation the supply line is closed especially in that the injection nozzles are closed, in particular since these are not needed in the stationary operation and therefore they are not energized.

In particular, with the blocking device opened, the supply line is closed on the one hand by the injection nozzles and on the other hand by the water container and thus it is also basically closed off from the surroundings. In one variant, an air intake for the drainage operation forms a third end, which is advisedly closed by an air valve when no air is being drawn in, i.e., when no drainage is occurring. The closure by the water container in particular is not necessarily pressure-tight, e.g., if the water container in one advantageous embodiment is connected to the surroundings by an excess pressure valve. In particular, however, the above-described problem of a possible partial vacuum will continue to exist.

A blocking device is provided along the supply line, i.e., in particular between the water container and the injection nozzles, which is open in the delivery operation and in the drainage operation and which is closed in the stationary operation in order to block the supply line and keep it dry. By stationary operation is meant in particular that the internal combustion engine is switched off, for example when the vehicle is parked. In the stationary operation, no injection of water occurs. The blocking device then separates the water container from the injection nozzles.

Other openings, for example those for the intake of air for purposes of drainage in the drainage operation, are also advisedly closed at least in the stationary operation. With such a closed supply line, dirt is prevented in an especially simple manner from getting into the device and ultimately clogging the injection nozzles or getting into the intake system or the engine. The blocking device then prevents an unwanted suctioning of water from the water container in the stationary operation on account of a pressure drop within the supply line, closed off from the surroundings. Accordingly, a closed supply line with the blocking device can also be exposed to low temperatures with no danger.

The invention in particular is based on the realization that even with a drained supply line the problem of possible damage due to freezing water still exists. This results in particular from the fact that, upon cooldown of the device and due to the closed nature of the supply line, the pressure in that supply line drops and water is drawn from the water container into the supply line and possibly as far as the injection nozzles. At suitably low outdoor temperatures, i.e., below the freezing point of water, the danger then exists of the freezing of the water that unintentionally went into the supply line. Due to the resulting ice pressure, the injection nozzles in particular and their valve mechanism, and hence the entire valve block, may become damaged.

Basically, it is possible to heat the supply line in the stationary operation, in order to prevent a pressure drop. But this requires energy, which is a drawback, and it is drawn for example from the battery of the vehicle, thereby contributing to its discharging. The result is a correspondingly large discharging of the battery, depending on the parked time.

On the other hand, it is much more advantageous to use a blocking device, which blocks the entrance to the water container in the stationary operation and thus prevents a penetration of water in particular in a mechanical manner. A major benefit of the invention thus consists in particular in that a damaging of the device by freezing water is prevented effectively and by a simple design. The blocking device is used for this, preventing a penetration of water from the water container in the direction of the injection nozzles, even when a pressure drop occurs in the supply line due to a cooldown of the device. The blocking device acts as a barrier so that the water cannot advance further into the supply line. Thus, the supply line is kept dry between the blocking device and the injection nozzles.

The blocking device in particular has only two switching states, namely, a closed and an open state. In the open state, water can be delivered through the blocking device; in the closed state, this is prevented.

Preferably, the blocking device is designed as a shutoff valve. Such a configuration is especially simple in terms of design and also especially cost-effective overall. The shutoff valve in particular is a simple valve with two connections, which are connected to the supply line, so that the valve divides the supply line into two segments, which are separated from each other in the closed state of the shutoff valve.

Advisedly, the blocking device is a separate component, i.e., especially an independent component, and therefore it can be freely positioned along the supply line. Moreover, the blocking device in this design can also be easily retrofitted on existing devices.

In an especially suitable embodiment, the blocking device is electrically switchable and is closed in the de-energized condition and opened in the energized condition. For example, the blocking device is an electrically switchable valve. Because the blocking device is closed in the de-energized condition, advantageously no power supply is needed for the blocking device in the stationary operation, when the supply line is supposed to be blocked. Power is then needed when the blocking device is opened, i.e., in the delivery operation and in the drainage operation.

In particular, a pump is arranged along the supply line, for the delivery of water. The pump has a suction side and a pressure side. In the delivery operation, the suction side of the pump is connected to the water container, in order to draw in water from it. The pressure side is connected to the injection nozzles. In this case, the connections are formed in particular by the supply line. In one preferred embodiment, the suction side and the pressure side in the delivery operation and in the drainage operation are identical, so that water flows in the same direction through the pump in both the delivery operation and the drainage operation. In other words: in the delivery operation, the suction side also corresponds to the suction side in the drainage operation and the pressure side in the delivery operation also corresponds to the pressure side in the drainage operation. In other words: in both modes, the pump is operated in the same direction. In this way, in particular, it is possible to do without a reverse rotation of the pump. Thus, a drainage operation is realized in the same direction as the delivery operation. The maintaining of the delivery direction of the pump in both modes also advantageously allows a use of pumps which are not suited to a reverse rotation. An especially suitable pump is an economical membrane pump and in general a pump not requiring any lubrication. Basically, however, any pump type can be used initially as the pump, especially also a piston pump.

For the switching between the delivery operation and the drainage operation, the device comprises in particular a valve which is preferably not the blocking device or does not comprise the latter, but rather is formed as a separate component. In this way, the switching between delivery and drainage operation is advantageously independent of the blocking of the supply line. The valve is advisedly arranged such that only one pump is needed for the water delivery and drainage. Only the valve is switched for the switching between the delivery operation and the drainage operation. The drainage operation is then in particular a back suction operation, i.e., water is sucked back into the water container in the drainage operation.

Especially suitable for the switching between delivery and drainage operation is a valve designed as a 4/2 way valve. This variant is significantly simplified in regard to the number of valves; in particular, only one valve is needed for the switching, and thus a particularly compact design of the device is made possible. Variants with other valves, especially as described in the aforementioned DE 10 2014 222 463 A1, are basically possible.

Preferably, the blocking device is arranged between the pump and the water container, i.e., on the suction side of the pump in the delivery operation. This advantageously prevents water from being suctioned as far as the pump and damaging it upon freezing. In particular, the same pump serves both for the delivery of water in the delivery operation and for the drainage in the drainage operation.

Furthermore, a design is especially expedient in which the blocking device is arranged between the valve and the water container, so that the supply line can be closed as effectively as possible independently of the switching state of the valve.

On the whole, it is advantageous for the blocking device to be arranged as close as possible to the water container, in order to block off the most distant parts of the supply line from the water container. In other words: the blocking device is advisedly arranged directly behind the water container. By "directly" is meant in particular that no other components are arranged along the supply line between the water container and the blocking device. Such a positioning of the blocking device as close as possible to the water container can be realized especially easily when the blocking device is designed as a separate part and it can be positioned correspondingly freely in the design of the device.

The method serves for operating a device for injecting water in a vehicle, especially a device as described above. In a delivery operation water is delivered from a water container via a supply line to a number of injection nozzles. The supply line is a closed line system in a stationary operation. Furthermore, a blocking device is arranged, being opened in the delivery operation and closed in the stationary operation, to keep the supply line dry between the blocking device and the injection nozzles. By "keep dry" is meant in particular that a penetration of water is prevented. Preferably, the injection nozzles and the supply line are drained in a drainage operation. The benefits of the method emerge analogously from the benefits of the above-described device.

When the vehicle is parked, the blocking device is advisedly opened and the drainage operation is turned on until such time as the supply line is filled only with air, i.e., it is completely drained and thus dry. After this, the drainage operation is switched off and the blocking device is closed. This ensures, first of all, that water having possibly collected in the supply line is initially removed prior to the blocking, before the supply line is blocked. Thus, the supply line is first dried and then blocked. This is advisedly done upon initiating the stationary operation, i.e., when the vehicle has been parked and the stationary operation is activated. The engine is then switched off and the vehicle is, as it were, prepared for the stationary operation by first draining the supply line and then finally blocking it.

The blocking device is preferably opened only in the delivery operation and in the drainage operation, being otherwise closed. This ensures that water can advance through the system only when water needs to be delivered through the supply line, but otherwise not. Thus, the supply line is blocked in standard operation and it is only opened when water is to be injected or suctioned back. Especially in the case of a valve as a blocking device which is de-energized in the closed state, this also reduces the power demand of the device.

In particular, a pump is arranged along the supply line, which in one preferred embodiment is switched on in the delivery operation and in the drainage operation, the blocking device being opened when the pump is switched on and closed when the pump is switched off. Thus, the pump and the blocking device are coupled together. In other words: if the pump is active, the blocking device is open, to enable a delivery of water, but if the pump is inactive, the blocking device is closed. In this embodiment, the power supply of the pump and the blocking device is advisedly coupled together, so that when the pump is activated the blocking device is also energized and accordingly opened automatically, otherwise being de-energized and closing automatically.

A control unit is arranged in particular for the actuating of the blocking device, the pump and/or the valve for switching between delivery and drainage modes. This is, for example, an independent control unit of the device, but preferably it is part of the engine controls of the vehicle. It may be a microprocessor based control unit.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 is a schematic diagram of a device for injecting water for a vehicle.

DETAILED DESCRIPTION OF THE DRAWING

FIG. 1 shows a device 2 for water injection, i.e. a water injection system. The device 2 comprises a water container 4 from which water is delivered to a number of injection nozzles 8 by way of a pump 6 in the delivery operation. The water is delivered via a supply line 10, along which the pump 6 is arranged. For the switching between the delivery operation and a drainage operation, a valve 12 is arranged along the supply line 10 between the water container 4 and the pump 6. This is connected to a suction side 6A and a pressure side 6B of the pump 6. The switching between delivery operation and drainage operation in the exemplary embodiment shown is realized by a single 4/2 way valve 12. The flow direction through the pump 6 is the same in both operating modes.

FIG. 1 shows the device 2 in a delivery operation, in which the suction side 6A is connected to the water container 4 and the pressure side 6B is connected to the injection nozzles 8. In the drainage operation, the suction side 6A is connected to the injection nozzles 8 and the pressure side 6B to the water container 4. For the switching between delivery operation and drainage operation, the valve 12 is moved by means of a control device 14 to the other respective switching state. In this mode, the pump 6 then delivers air in the direction of the container 4, whereby the supply line 10 and the injection nozzles 8 are drained and dried.

When the vehicle is parked, it is possible for the supply line 10 to cool down, thus creating a partial vacuum and suctioning water from the water container 4 into the supply line 10 and in the direction of the injection nozzles 8. During low outdoor temperatures of below 0° C., the danger then exists of this water freezing and the supply line 10 and/or the injection nozzles 8 being damaged. In order to prevent this, a blocking device 16 is arranged along the supply line 10. The blocking device is designed here as a shutoff valve. The blocking device 16 is then closed in the stationary operation, so that no water is sucked into the supply line 10 despite the possibly low temperature.

An especially comprehensive protection of the supply line 10 is achieved by arranging the blocking device 16 as close as possible and, as shown in FIG. 1, directly behind the water container 4 and still before the pump 6 and the valve 12. The blocking device 16 is furthermore designed as a separate part and is not integrated in the pump 6 or the valve 12. In particular, the blocking device 16 can thus be operated independently of the valve 12.

LIST OF REFERENCE NUMBERS 2 device for water injection
4 water container
6 pump
6A suction side
6B pressure side
8 injection nozzle
10 supply line
21 valve
14 control unit
16 blocking device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for injecting water in a vehicle, comprising:
   a supply line;
   a water container which is connected to a number of injection nozzles via the supply line, with a delivery operation for pumping water from the water container to the injection nozzles via the supply line and with a stationary operation in which the supply line is a closed line system;
   a pump arranged along the supply line;
   a flow direction switching valve; and
   a blocking device provided along the supply line,
   wherein
      the supply line extends between the water container and the injection nozzles,
      the flow direction switching valve is connected along the supply line between the blocking device, an inlet and an outlet of the pump, and a portion of the supply line having the injection valves,
      the blocking device is between the water container and the pump, and
      the blocking device is open in the delivery operation and is closed in the stationary operation in order to block and keep dry the supply line.

2. The device as claimed in claim 1, wherein the blocking device is a shutoff valve.

3. The device as claimed in claim 1, wherein the blocking device is configured as a separate component.

4. The device as claimed in claim 1, wherein the blocking device is electrically switchable and is closed in a de-energized state and opened in an energized state.

5. The device as claimed in claim 1, wherein the blocking device is arranged directly behind the water container.

6. A method of operating a device for injecting water in a vehicle, the method comprising the acts of:
   in a delivery operation, delivering water using a pump from a water container via a supply line to a number of injection nozzles, wherein the supply line is a closed line system in a stationary operation; and
   operating a blocking device between the water container and the pump in the delivery operation and closing the blocking device in the stationary operation, wherein the blocking device is arranged in the supply line so as to keep the supply line dry between the blocking device and the injection nozzles in the stationary operation.

7. The method as claimed in claim 6, wherein the injection nozzles and the supply line are drained in a drainage operation.

8. The method as claimed in claim 7, wherein when the vehicle is parked, the blocking device is opened and the drainage operation is turned on until such time as the supply line is filled only with air, and then the drainage operation is switched off and the blocking device is closed.

9. The method as claimed in claim 7, wherein the blocking device is opened only in the delivery operation and in the drainage operation, being otherwise closed.

10. The method as claimed in claim 6, wherein a pump is arranged along the supply line, and the blocking device is opened when the pump is switched on and closed when the pump is switched off.

11. The method as claimed in claim 8, wherein a pump is arranged along the supply line, and the blocking device is opened when the pump is switched on and closed when the pump is switched off.

12. The method as claimed in claim 9, wherein a pump is arranged along the supply line, and the blocking device is opened when the pump is switched on and closed when the pump is switched off.

* * * * *